(12) United States Patent
Asano

(10) Patent No.: US 7,088,373 B2
(45) Date of Patent: Aug. 8, 2006

(54) LINK FILE GENERATING PROGRAM PRODUCT, METHOD AND APPARATUS FOR GENERATING LINK FILE USED FOR COLOR MATCHING SYSTEM

(75) Inventor: Motohiro Asano, Osaka (JP)

(73) Assignee: Minolta Co., Ltd., Osaka (JP)

( * ) Notice: Subject to any disclaimer, the term of this patent is extended or adjusted under 35 U.S.C. 154(b) by 6 days.

(21) Appl. No.: 10/437,077

(22) Filed: May 14, 2003

(65) Prior Publication Data

US 2004/0160454 A1 Aug. 19, 2004

(30) Foreign Application Priority Data

Feb. 7, 2003 (JP) .............................. 2003-031382

(51) Int. Cl.
  *G09G 5/02* (2006.01)
(52) U.S. Cl. ...................... 345/600; 358/518
(58) Field of Classification Search ........ 345/589–591, 345/600–604; 358/518, 523, 520; 382/167
  See application file for complete search history.

(56) References Cited

U.S. PATENT DOCUMENTS 5,881,211 A * 3/1999 Matsumura ................ 358/1.9
2003/0210414 A1* 11/2003 Kuno ........................ 358/1.9

FOREIGN PATENT DOCUMENTS

| JP | 08-256275 A | 10/1996 |
|----|-------------|---------|
| JP | 10-285414 A | 10/1998 |
| JP | 11-298746 A | 10/1999 |
| JP | 2000-184222 A | 6/2000 |
| JP | 2002-051230 A | 2/2002 |
| JP | 2002-152536 A | 5/2002 |
| JP | 2002-171418 A | 6/2002 |

OTHER PUBLICATIONS

Foley, Dam, Feiner, Hughes, Computer Grqaphics: Principles and Practice, 1996,Addison-Wesley, Second Edition, pp. 588-589, 599-600 and color plate II.6.*

* cited by examiner

*Primary Examiner*—Kee M. Tung
*Assistant Examiner*—G. F. Cunningham
(74) *Attorney, Agent, or Firm*—Buchanan Ingersoll PC

(57) ABSTRACT

In order to suppress undesired influence of interpolation at the time of color-converting image data, a link file generating program makes a computer execute the steps of coupling a monitor profile and a printer profile to generate a link file linking display-dependent colors (RGB data) to printer-dependent colors (CMYK data), and correcting the link file to adapt a printer-dependent color related to a prescribed one of the display-dependent colors to said prescribed one. Using a display-dependent color as a reference, a printer-dependent color related to the reference color is corrected. Accordingly, a link file can be generated that suppresses the undesired influence of interpolation at the time of color-converting the image data.

4 Claims, 16 Drawing Sheets

F I G. 3
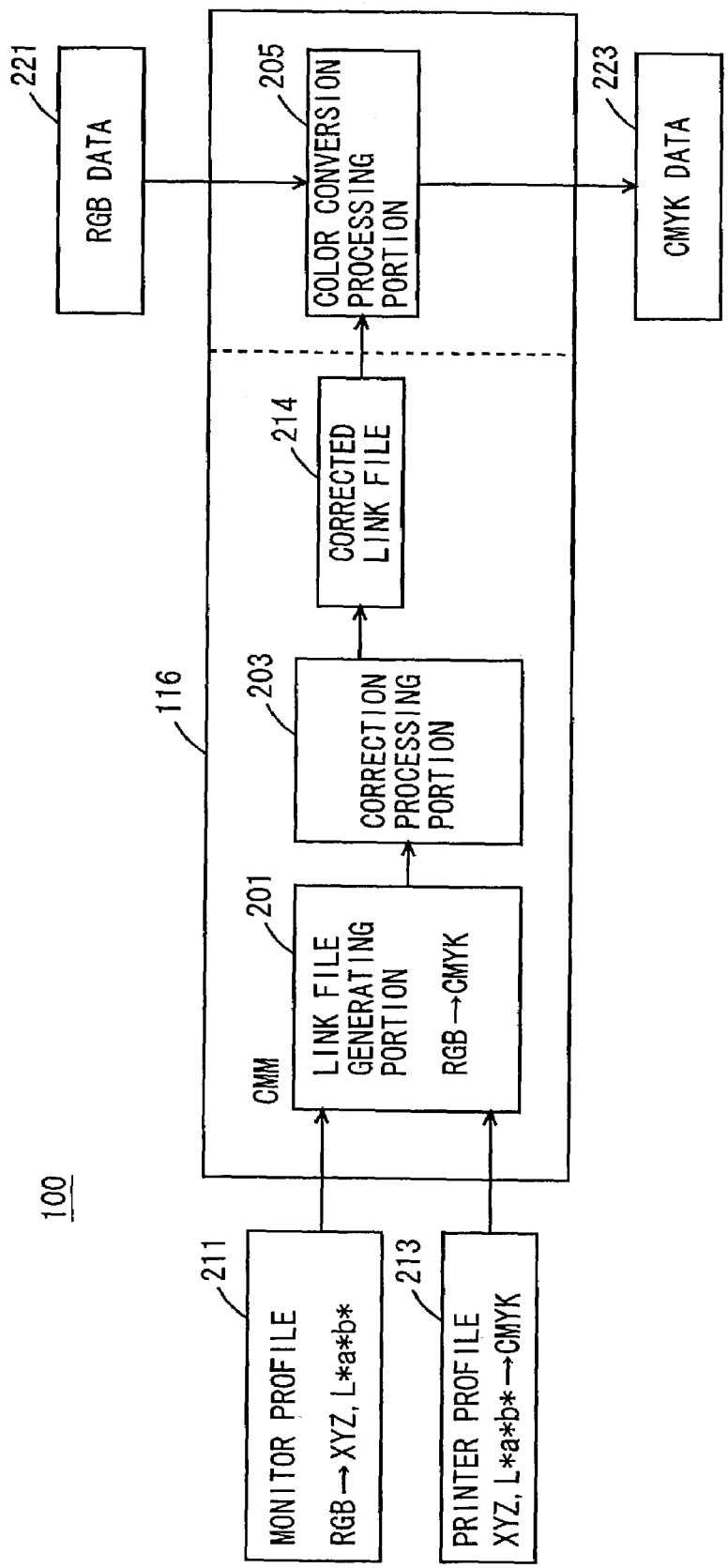

HUE LINE 1 IN RGB SPACE

HUE LINE 2 IN RGB SPACE

FIG. 6

| LATTICE POINT NO. | RGB | CMYK |
|---|---|---|
| 1 (RED) | (255, 0, 0) | (3, 251, 253, 0) |
| 2 | (255, 16, 16) | (5, 241, 237, 1) |
| 3 | (255, 32, 32) | (2, 225, 221, 1) |
| 4 | (255, 48, 48) | (0, 204, 205, 0) |
| 5 | (255, 64, 64) | (1, 195, 193, 0) |
| 6 | (255, 80, 80) | (4, 171, 170, 1) |
| 7 | (255, 96, 96) | (2, 158, 155, 2) |
| 8 | (255, 112, 112) | (0, 143, 141, 0) |
| 9 | (255, 128, 128) | (2, 127, 128, 0) |
| 10 | (255, 144, 144) | (0, 110, 112, 0) |
| 11 | (255, 160, 160) | (1, 95, 96, 0) |
| 12 | (255, 176, 176) | (2, 82, 79, 1) |
| 13 | (255, 192, 192) | (0, 62, 63, 0) |
| 14 | (255, 208, 208) | (0, 48, 47, 0) |
| 15 | (255, 224, 224) | (0, 31, 30, 0) |
| 16 | (255, 240, 240) | (2, 15, 16, 0) |
| 17 (WHITE) | (255, 255, 255) | (0, 0, 0, 0) |

FIG. 8

| LATTICE POINT NO. | RGB | CORRECTED C' M' Y' K' |
|---|---|---|
| 1 (RED) | (255, 0, 0) | (0, 252, 254, 0) |
| 2 | (255, 16, 16) | (0, 244, 240, 0) |
| 3 | (255, 32, 32) | (0, 226, 222, 0) |
| 4 | (255, 48, 48) | (0, 204, 205, 0) |
| 5 | (255, 64, 64) | (0, 195, 193, 0) |
| 6 | (255, 80, 80) | (0, 173, 172, 0) |
| 7 | (255, 96, 96) | (0, 160, 157, 0) |
| 8 | (255, 112, 112) | (0, 143, 141, 0) |
| 9 | (255, 128, 128) | (0, 128, 129, 0) |
| 10 | (255, 144, 144) | (0, 110, 112, 0) |
| 11 | (255, 160, 160) | (0, 95, 96, 0) |
| 12 | (255, 176, 176) | (0, 83, 80, 0) |
| 13 | (255, 192, 192) | (0, 62, 63, 0) |
| 14 | (255, 208, 208) | (0, 48, 47, 0) |
| 15 | (255, 224, 224) | (0, 31, 30, 0) |
| 16 | (255, 240, 240) | (0, 16, 17, 0) |
| 17 (WHITE) | (255, 255, 255) | (0, 0, 0, 0) |

FIG. 9

| LATTICE POINT NO. | RGB | CMYK |
| --- | --- | --- |
| 1 (BLACK) | (0, 0, 0) | (137, 144, 0, 255) |
| 2 | (0, 0, 16) | (170, 121, 0, 252) |
| 3 | (0, 0, 32) | (219, 100, 0, 230) |
| 4 | (0, 0, 48) | (235, 125, 1, 187) |
| 5 | (0, 0, 64) | (248, 145, 2, 151) |
| 6 | (0, 0, 80) | (250, 173, 4, 117) |
| 7 | (0, 0, 96) | (253, 181, 6, 74) |
| 8 | (0, 0, 112) | (251, 189, 7, 43) |
| 9 | (0, 0, 128) | (255, 194, 5, 20) |
| 10 | (0, 0, 144) | (255, 191, 2, 6) |
| 11 | (0, 0, 160) | (255, 177, 0, 0) |
| 12 | (0, 0, 176) | (255, 178, 0, 0) |
| 13 | (0, 0, 192) | (255, 176, 0, 0) |
| 14 | (0, 0, 208) | (255, 170, 0, 0) |
| 15 | (0, 0, 224) | (255, 162, 0, 0) |
| 16 | (0, 0, 240) | (254, 154, 0, 0) |
| 17 (BLUE) | (0, 0, 255) | (253, 151, 0, 0) |

F I G. 1 1

| LATTICE POINT NO. | RGB | CORRECTED C' M' Y' K' |
|---|---|---|
| 1 (BLACK) | (0, 0, 0) | (137, 144, 0, 255) |
| 2 | (0, 0, 16) | (175, 122, 0, 246) |
| 3 | (0, 0, 32) | (208, 116, 1, 223) |
| 4 | (0, 0, 48) | (234, 124, 1, 189) |
| 5 | (0, 0, 64) | (244, 148, 3, 152) |
| 6 | (0, 0, 80) | (250, 166, 4, 114) |
| 7 | (0, 0, 96) | (251, 181, 6, 78) |
| 8 | (0, 0, 112) | (253, 188, 6, 46) |
| 9 | (0, 0, 128) | (254, 191, 4, 23) |
| 10 | (0, 0, 144) | (255, 187, 2, 8) |
| 11 | (0, 0, 160) | (255, 182, 1, 2) |
| 12 | (0, 0, 176) | (255, 177, 0, 0) |
| 13 | (0, 0, 192) | (255, 175, 0, 0) |
| 14 | (0, 0, 208) | (255, 170, 0, 0) |
| 15 | (0, 0, 224) | (255, 162, 0, 0) |
| 16 | (0, 0, 240) | (254, 156, 0, 0) |
| 17 (BLUE) | (0, 0, 255) | (253, 151, 0, 0) |

FIG. 15

| LATTICE POINT NO. | RGB | CMYK | CORRECTED C'M'Y'K' |
|---|---|---|---|
| 1 | (0, 0, 255) | (245, 241, 3, 1) | (255, 178, 0, 0) |

LINK FILE GENERATING PROGRAM PRODUCT, METHOD AND APPARATUS FOR GENERATING LINK FILE USED FOR COLOR MATCHING SYSTEM

This application is based on Japanese Patent Application No. 2003-31382, the entire content of which is hereby incorporated by reference.

BACKGROUND OF THE INVENTION

1. Field of the Invention

The present invention relates to a link file generating program, a color conversion program and a link file generating apparatus and, more specifically, to a link file generating program, a color conversion program and a link file generating apparatus that are used for a color matching system.

2. Description of the Related Art

It is a conventional practice to print, by a printer, image data acquired by reading a document by a scanner or image data displayed on a display. The image data that is processed by a scanner or a display has its colors represented by three elements, that is, red (R), green (G) and blue (B). This color system is referred to as the RGB color system. The image data processed by a printer has its color represented by four elements, that is cyan (C), magenta (M), yellow (Y) and black (K). This color system is referred to as the CMYK color system. As the color systems for the image data to be processed differ between the two devices, a color conversion process is performed, in which the image data is converted from one color system to another.

Color management system has been known as a system enabling execution of the color conversion process among a plurality of devices. In the color management system, XYZ color system or L*a*b*color system, for example, is defined as a color system independent of any of the devices (device-independent). Each device is provided with a corresponding profile, so that image data of the color system dependent on that device (device-dependent) is converted to a device-independent color system. The profile is, by way of example, data that relates a color (dependent color) represented by the RGB color system to a color (independent color) represented by the XYZ color system, in the form of a matrix or a table.

More detailed description will be given with reference to the figures. FIG. 16 is a schematic diagram of a conventional color management system. Referring to FIG. 16, in order to illustrate the method of color matching between an input device 1401 and an output device 1407, a flow of image data is shown. Here, the image data reproduced by input device 1401 such as a CRT or a scanner is RGB data represented by the RGB color system, and the image data reproduced by output device 1407 such as a printer is CMYK data represented by the CMYK color system. As can be seen from this figure, the RGB data goes through various conversion processes at a color conversion processing portion 1403, to be eventually converted to the CMYK data.

First, the RGB data at input device 1401 is input to color conversion processing portion 1403, and converted to data of a device-independent color system. As described above, the device-independent color system includes the L*a*b* color system and the XYZ color system. Here, it is assumed that the data is converted to data represented by the XYZ color system (XYZ data). The conversion process includes a conversion using a matrix and a conversion using an LUT (Look Up Table), as shown in FIG. 16.

Then, the converted XYZ data is converted to XYZ data in a range that can be reproduced by output device 1407, by a Gamut mapping portion 1405. Specifically, here at the Gamut mapping portion, color matching between input device 1401 and output device 1407 is performed.

The data after color matching is still the data of the device-independent XYZ color system (XYZ data), and therefore, the data is again converted to the CMYK data. Here again, the conversion process includes a conversion process using an LUT (Look Up Table) or a conversion process in accordance with masking method.

In this manner, the image data reproduced by input device 1401 is once converted to data of a device-independent color system, and thereafter, color matching is performed to enable reproduction by output device 1407.

There is a problem, however, that hue distortion results from the color conversion in the color management system. In order to cope with this problem, Japanese Patent Laying-Open No. 2002-152536 describes a technique in which, as the profile to be used for the conversion of image data in a device-dependent color system to data in a device-independent color system, a profile having hue distortion corrected in the device-independent color system is generated.

As already described, the profile relates device-dependent colors to device-independent colors. In order to reduce data amount, not every device-dependent color is related to the device-independent color. Therefore, when conversion to data in a device-independent color system is made, data that is not defined by the profile is calculated by interpolation using defined data. For the interpolation, cubic interpolation, for example, is used. The cubic interpolation will be described by way of example. Assume that in a profile of an input device, device-dependent RGB color system and device-independent L*a*b* color system are related to each other, and in a profile of an output device, device-independent L*a*b* color system and device-dependent CMYK color system are related to each other. Here, consider an example in which "red" in the RGB color system (RGB=(255,0,0)) is to be reproduced in the CMYK color system in which the corresponding "red" is given as CMYK=(0,255, 255,0).

By a conversion process in accordance with a matrix or an LUT using the profile of the input device, RGB=(255,0,0) is converted, for example, to L*a*b*=(52.2,80.1,67.2). As L*a*b*=(52.2,80.1,67.2) is not defined in the profile of the output device, cubic interpolation is performed, using values of surrounding 8 points that are defined. The surrounding 8 points may be L*a*b*=(48,80,64), (64,80,64), (48,96,64), (64,96,64), (48,80,80), (64,80,80), (48,96, 80) and (64, 96, 80). These 8 points are slightly away from red, and therefore, the CMYK data in the CMYK color system obtained by the cubic interpolation using these points is not CMYK=(0,255, 255,0). The cubic interpolation is a conventionally well-known technique, and therefore, detailed description thereof will not be repeated here.

As described above, there is always an error resulting from the interpolation, and hence image data after color conversion may have hue distortion due to the error. Particularly, when the image data includes a gradation area that has the same hue but brightness or chroma changed gradually, there is a problem that the gradation is hard to reproduce.

In the technique described in Japanese Patent Laying-Open No. 2002-152536, conversion is performed using a profile, and therefore, it is possible to prevent hue distortion for the data defined by the profile. Data that are not defined, however, are interpolated, and therefore, there is a possibility of hue distortion caused by the error resulting from the interpolation.

SUMMARY OF THE INVENTION

The present invention was made to solve the above described problem, and its object is to provide a link file generating program, a link file generating method and a link file generating apparatus that can generate a link file in which undesirable influence of interpolation at the time of color-converting image data is suppressed.

Another object of the present invention is to provide a link file generating program, a link file generating method and a link file generating apparatus that enable highly precise and easy adjustment of colors before and after color conversion.

A still further object of the present invention is to provide a link file generating program, a link file generating method and a link file generating apparatus that suppress undesirable influence of interpolation at the time of color-converting image data.

According to an aspect, in order to attain the above described objects, the present invention provides a link file generating program that makes a computer execute the step of coupling characteristics descriptive data of a first device relating colors dependent and independent of the first device to each other with characteristics descriptive data of a second device, to generate a link file relating the colors dependent on the first device to colors dependent on the second device, and the step of correcting the link file to adapt a color dependent on the second device and related to a prescribed one of the colors dependent on the first device, to the prescribed one dependent color.

According to the present invention, a link file is generated by coupling the characteristic descriptive data of the first device to the characteristic descriptive data of the second device, and the link file is corrected so as to adapt a color dependent on the second device, which is related to a prescribed one of the colors dependent on the first device, to the prescribed one dependent color. Using a first-device dependent color as a reference, a second-device dependent color that is related thereto is corrected. Therefore, a link file generating program can be provided that can generate a link file having the undesirable influence of interpolation at the time of color-converting image data suppressed. Further, as the link file is corrected without modifying the characteristic descriptive data of the first device and the second device, a link file generating program can be provided that enables highly precise and easy adjustment of colors before and after color conversion.

Preferably, the computer is further made to execute the step of converting image data defined by the first-device dependent colors to image data defined by the second-device dependent colors, using the corrected link file.

According to the present invention, using a first-device dependent color as a reference, a second-device dependent color related thereto is corrected and the link file is corrected accordingly. Therefore, a color conversion program can be provided that suppresses undesirable influence of interpolation at the time of color-converting image data.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a functional block diagram illustrating a function of the link file generating apparatus in accordance with the first embodiment.

FIG. 6 represents RGB data and printer-dependent colors (CMYK data) of the lattice points existing on a hue-line from red (R) to white (W), related by the link file.

FIG. 8 represents RGB data and printer-dependent colors (C'M'Y'K' data) after correction, of the lattice points existing on a hue-line from red (R) to white (W), related by the link file.

FIG. 9 represents RGB data and printer-dependent colors (CMYK data) of the lattice points existing on a hue-line from blue (B) to black (K), related by the link file.

FIG. 11 represents RGB data and printer-dependent colors (C'M'Y'K' data) after correction, of the lattice points existing on a hue-line from blue (B) to black (K), related by the link file.

FIG. 15 shows an example of RGB data (RGB=(0,0,255)) and printer-dependent colors (CMYK data and C'M'Y'K' data) before and after correction, of the lattice point of blue related by the link file generating apparatus in accordance with the third embodiment.

DESCRIPTION OF THE PREFERRED EMBODIMENTS

Figure 1:
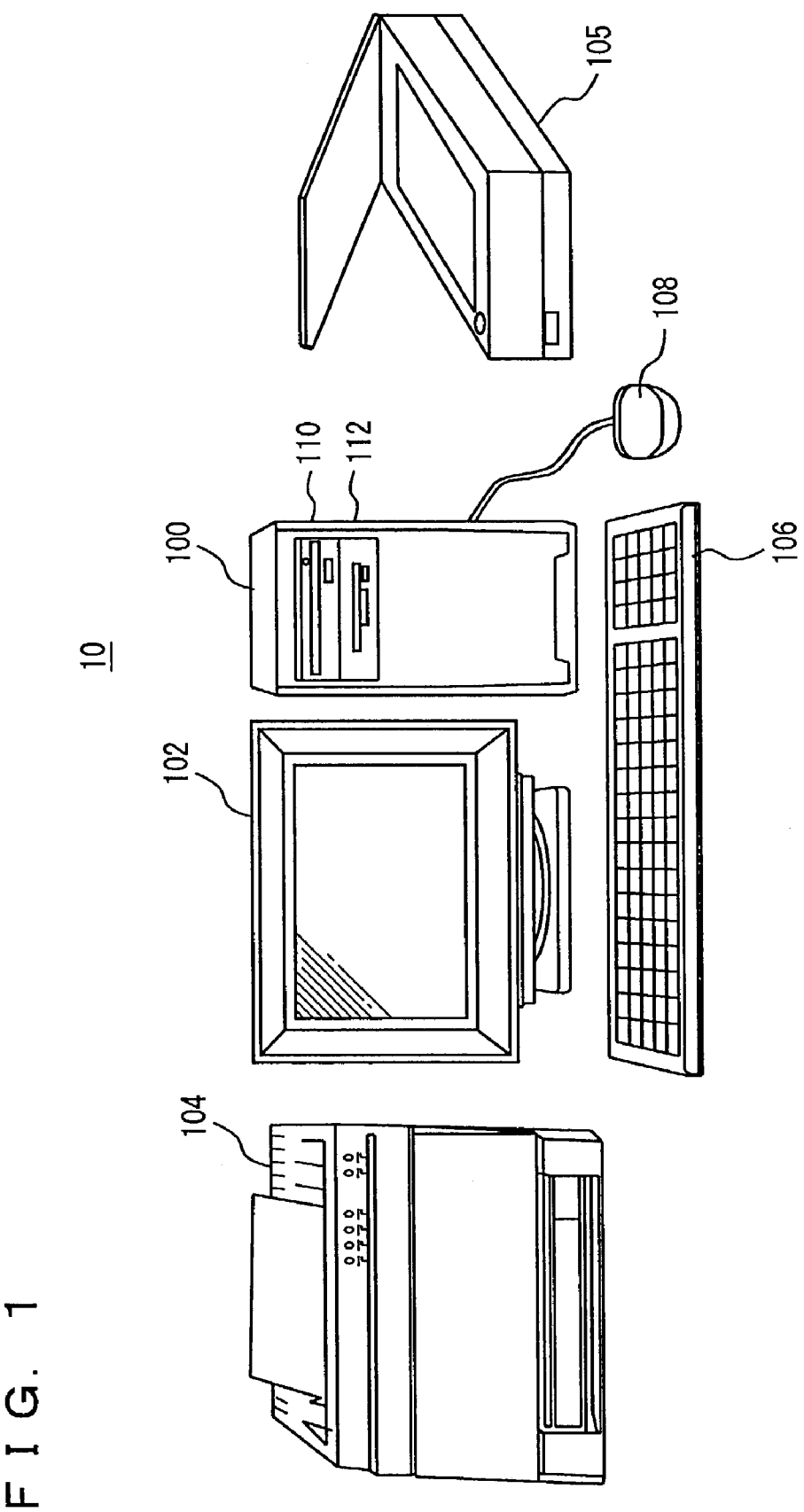
FIG. 1 shows an appearance of the link file generating system in accordance with a first embodiment of the present invention.

Embodiments of the present invention will be described in the following, with reference to the figures. In the following description, the same components are denoted by the same reference characters. Names and functions thereof are also the same. Therefore, detailed description thereof will not be repeated.

First Embodiment

FIG. 1 shows an appearance of the link file generating system in accordance with a first embodiment of the present invention. Referring to FIG. 1, link file generating system 10 includes a link file generating apparatus provided with a CD-ROM (Compact Disc Read-Only Memory) drive 110 and an FD (Flexible Disk) drive 112, a display 102, a printer 104, a scanner 105, a keyboard 106 and a mouse 108.

Figure 2:
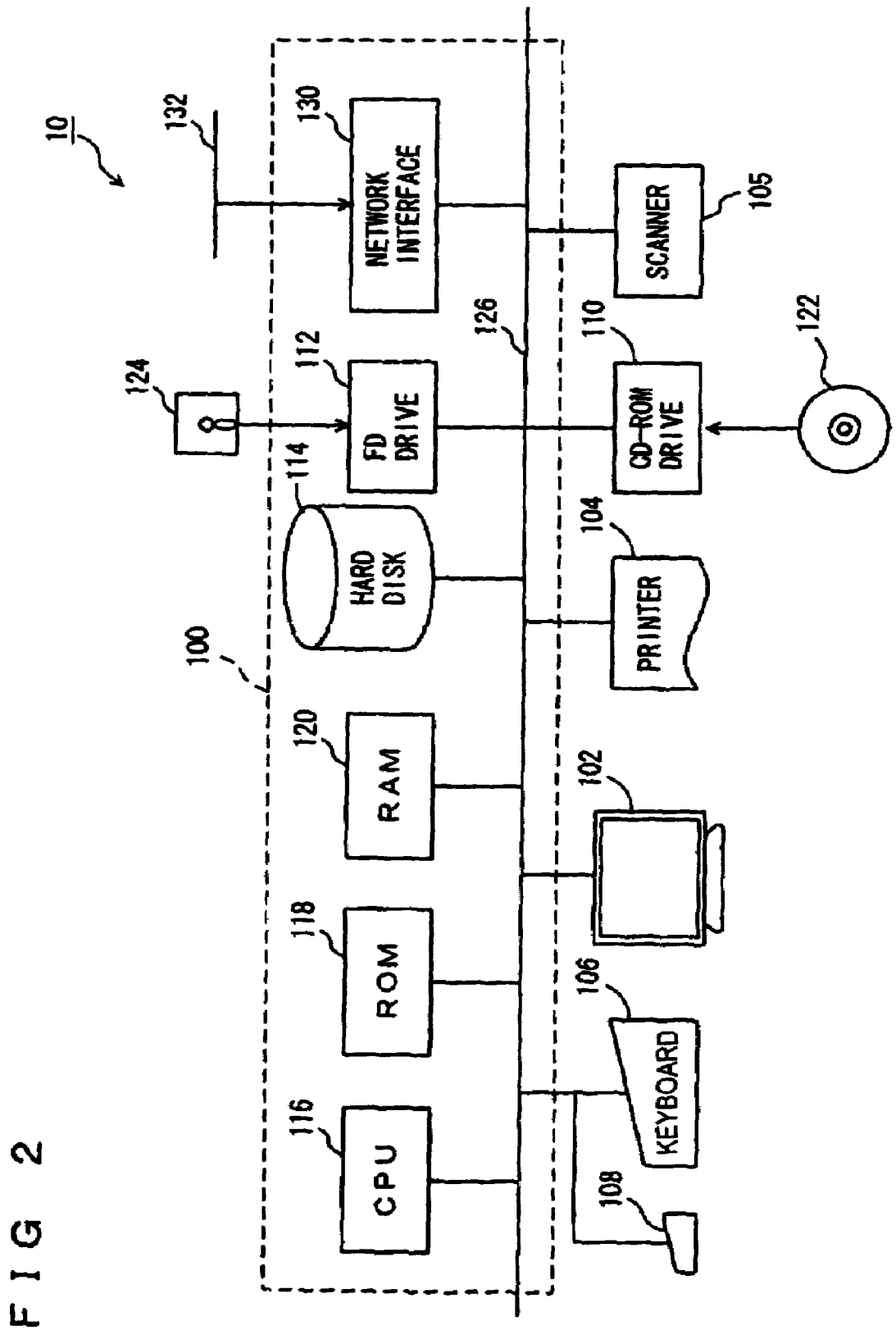
FIG. 2 is a block diagram illustrating a configuration of the link file generating apparatus in accordance with the first embodiment of the present invention.

FIG. 2 illustrates, in a block diagram, the configuration of link file generating apparatus 100. As can be seen from FIG. 2, link file generating apparatus 100 includes, each connected to a bus 126, a CPU (Central Processing Unit) 116, an ROM (Read-Only Memory) 118 storing a boot-up program for an operating system and the like, an RAM (Random Access Memory) 120 for loading a program to be executed and for storing data during execution of the program, a hard disk 114 for storing, in a non-volatile manner, a formed program and the like, and a network interface 130 for connecting link file generating apparatus 100 to a network 132. A CD-ROM 122 is mounted on CD-ROM drive 110. An FD 124 is mounted on FD drive 112.

In this manner, link file generating apparatus 100 is implemented by a general personal computer. The operation of a personal computer itself is well known, and therefore detailed description thereof will not be repeated here.

In hard disk 114 of link file generating apparatus 100, respective profiles of display 102, scanner 105, and printer 104 (device characteristics data) are stored. The profiles may be input from respective devices to link file generating apparatus 100, or a profile stored in FD 124 or CD-ROM 122 may be input through FD drive 112 or CD-ROM drive 110. Further, a profile may be input from a device such as a printer or a computer connected to network 132, through network interface 130. These profiles are stored in hard disk 114, in correspondence to the devices.

When the link file generating program is executed by CPU 116, a process of linking the profiles stored in hard disk 114 is executed. Generally, such a link file generating program is delivered stored in a storage medium such as CD-ROM 122 or FD 124, read from the storage medium by CD-ROM drive 110 or FD drive 112, and once stored in hard disk 114. Further, the program is read from hard disk 114 and executed by CPU 116.

The storage medium is not limited to CD-ROM 122, FD 124 or hard disk 114, and any medium may be used that fixedly carry the program such as a magnetic tape, a cassette tape, an optical disk (MO (Magnetic Optical Disc)/MD (Mini Disc)/DVD (Digital Versatile Disc)), an IC card (including a memory card), an optical card, or semiconductor memories such as a mask ROM, EPROM, EEPROM and a flash ROM.

The term program used here represents a concept that includes not only the program that can be directly executed by CPU 116 but also a program in the source program format, a compressed program, an encoded program and so on.

In the following, an example will be described in which a profile of display 102 is linked to a profile of printer 104 and a new link file is generated by link file generating apparatus 100 in accordance with the present embodiment. In the following description, the profile of display 102 will be referred to as monitor profile, and the profile of printer 104 will be referred to as printer profile.

In link file generating apparatus 100, a link file is generated when, for example, image data formed by a drawing program executed by link file generating apparatus 100 is to be printed by printer 104. The user of link file generating apparatus 100 has the drawing program executed, and operates while viewing the drawing displayed on display 102. Therefore, the image data formed by the drawing program is the data defined by colors dependent on display 102. In order to print the data by printer 104, color conversion becomes necessary.

FIG. 3 is a functional block diagram representing a function of link file generating apparatus 100 in accordance with the present embodiment. Monitor profile 211 and printer profile 213 relate colors of the device-dependent color system (dependent colors) to colors of the device-independent color system (independent colors), and they are device characteristic descriptive data describing characteristics of the devices. Specifically, monitor profile 211 is a matrix relating colors of the RGB color system dependent on display 102 (dependent colors) to colors of the XYZ system independent of display 102 (independent colors). Printer profile 213 is a look-up table relating colors of the CMYK color system dependent on printer 104 (dependent colors) to colors of the XYZ color system independent of printer 104 (independent colors).

When the link file generating program is executed by CPU 116, a link file generating portion 201, a correction processing portion 203 and a color conversion processing portion 205 are formed in CPU 116. In the present embodiment, it is assumed that the link file generating program is executed by CPU 116. Link file generating portion 201, correction processing portion 203 and color conversion processing portion 205 may be implemented by hardware circuits.

Link file generating portion 201 generates a link file by linking monitor profile 211 to printer profile 213. Link file generating portion 201 reads monitor profile 211 and printer profile 213 stored in hard disk 114. Then, colors dependent on display 102 defined by monitor profile 211 are converted to independent colors. The conversion process using monitor profile 211 is defined by the following equation (1).

$$(X, Y, Z) = Fmon (R, G, B) \quad (1)$$

A so called Gamut mapping is executed, by which the XYZ data obtained by the conversion using equation (1) is converted to XYZ data in a range that can be reproduced by printer 104. Gamut mapping is a conventionally known technique, and therefore, detailed description thereof will not be repeated here.

The independent colors obtained by the conversion are converted to colors dependent on printer 104, using printer profile 213. The conversion process using printer profile 213 is defined by the following equation (2).

$$(C, M, Y, K) = Fpri (L^*, a^*, b^*) \quad (2)$$

Here, if an independent color obtained by the conversion is not defined by printer profile 213, cubic interpolation is performed, and a color dependent on printer 104 is obtained.

This linking is executed for every dependent color of display 102 defined by monitor profile 211, and a link file is generated. The generated link file is a look-up table representing the relation between the colors dependent on display 102 defined by monitor profile 211 and the colors dependent on printer 104. In the present embodiment, the size of the link file (look-up table) is 17×17×17. The size of the link file is not limited thereto, and the file may have an arbitrary size.

Correction processing portion 203 corrects the link file generated by link file generating portion 201, and outputs the corrected link file 214. The link file includes an error or errors, as the cubic interpolation is performed, as described above. Therefore, when the image data is printed by printer 104 using the link file, image data will be printed with the hue distorted. Correction processing portion 203 corrects the link file to suppress hue distortion.

The link file is a look-up table representing relation between the colors dependent on display 102 defined by monitor profile 211 and the colors dependent on printer 104.

The input side data (here, the colors dependent on display 102) of 17×17×17 defined by the generated link file will be referred to as lattice points. Correction processing portion 203 corrects such that the color dependent on printer 104 related to the lattice point data of the same hue comes to have the color of the lattice point data. The correcting process will be described in detail later.

Color conversion processing portion 205 converts, using the corrected link file 214, the RGB data 221 processed by display 201 to the CMYK data to be processed by printer 104. As the color conversion is performed using the corrected link file 214, it is possible to suppress color distortion of the images printed by the printer.

Figure 4:
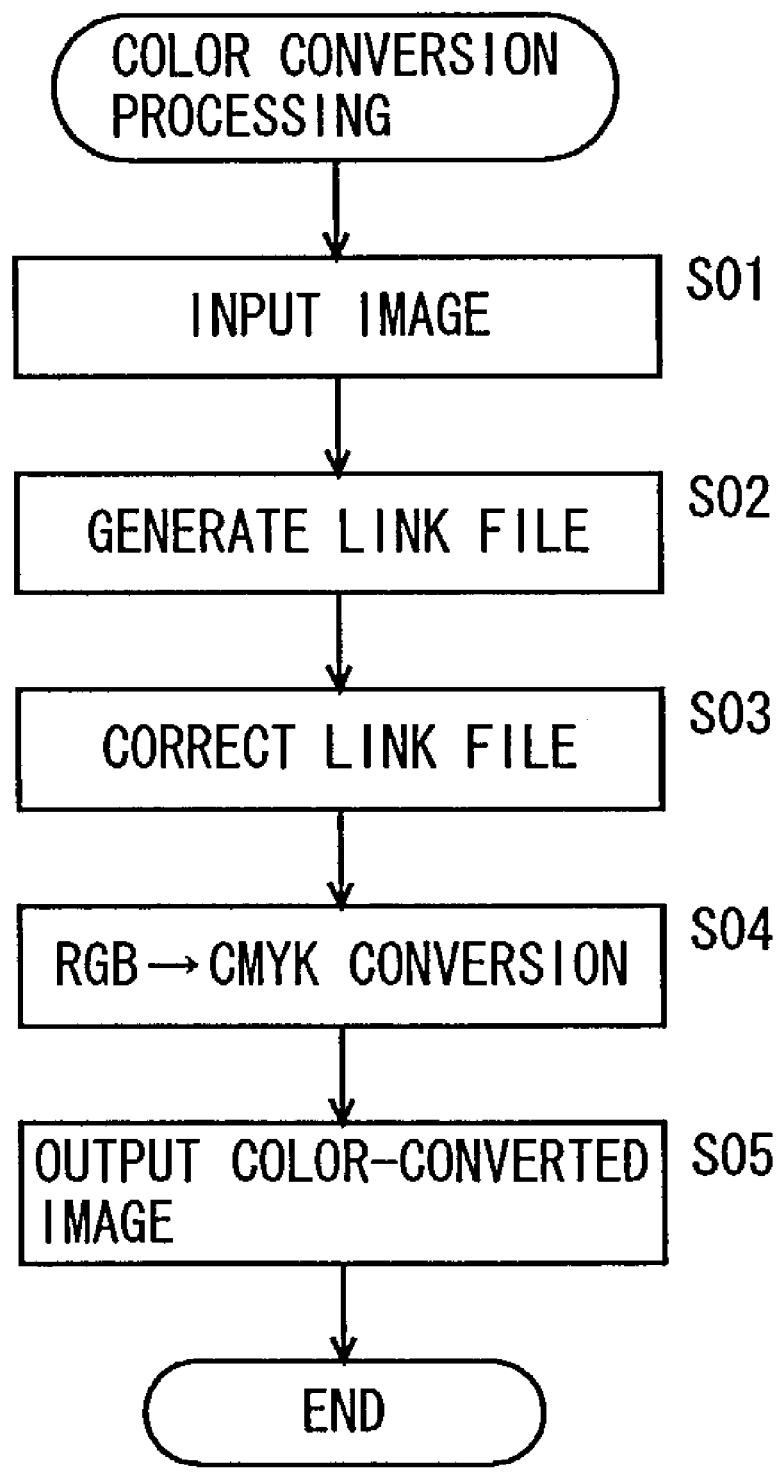
FIG. 4 is a flow chart representing a flow of the color converting process executed by the link file generating apparatus in accordance with the first embodiment.

FIG. 4 is a flow chart representing a flow of the color conversion process executed by link file generating apparatus 100 in accordance with the present embodiment. Referring to FIG. 4, link file generating apparatus 100 receives as inputs the RGB data 221 as the image to be processed (step S01). Then, at link file generating portion 201, monitor profile 211 and printer profile 213 are linked, and a link file is generated (step S02).

At correction processing portion 203, the link file generated in step S02 is corrected (step S03). Accordingly, the link file is corrected to the one that enables color conversion with reproduction of gradations improved. Further, at color conversion processing portion 205, using the corrected link file 214, the RGB data input in step S01 is converted to the CMYK data 223 (step S04). The converted CMYK data 223 is output to printer 104 (step S05).

Figure 5A:
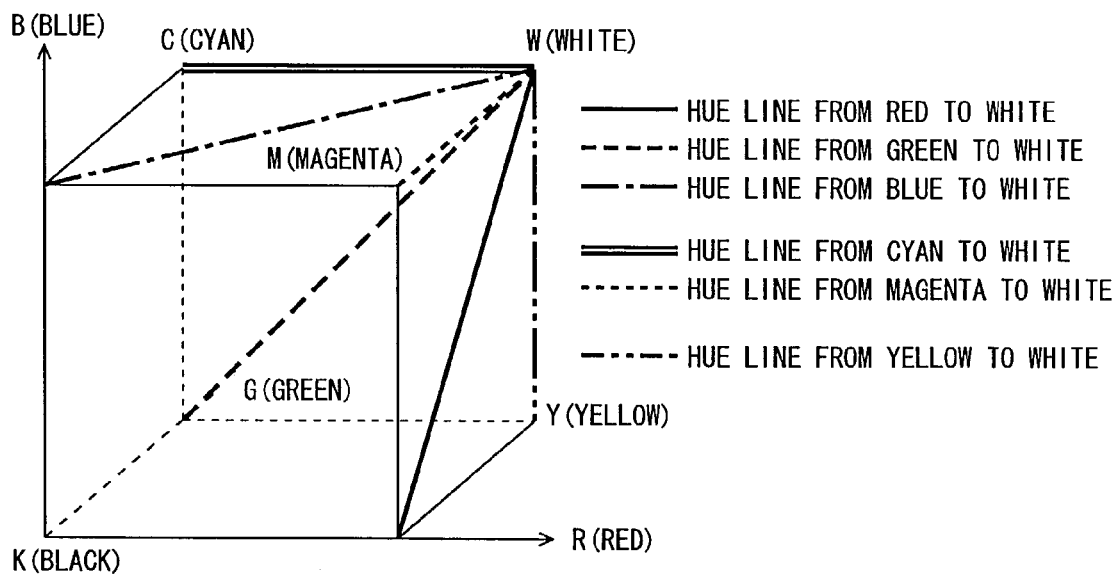
FIGS. 5A and 5B represent lattice points as the object of a correcting process.
Figure 5B:
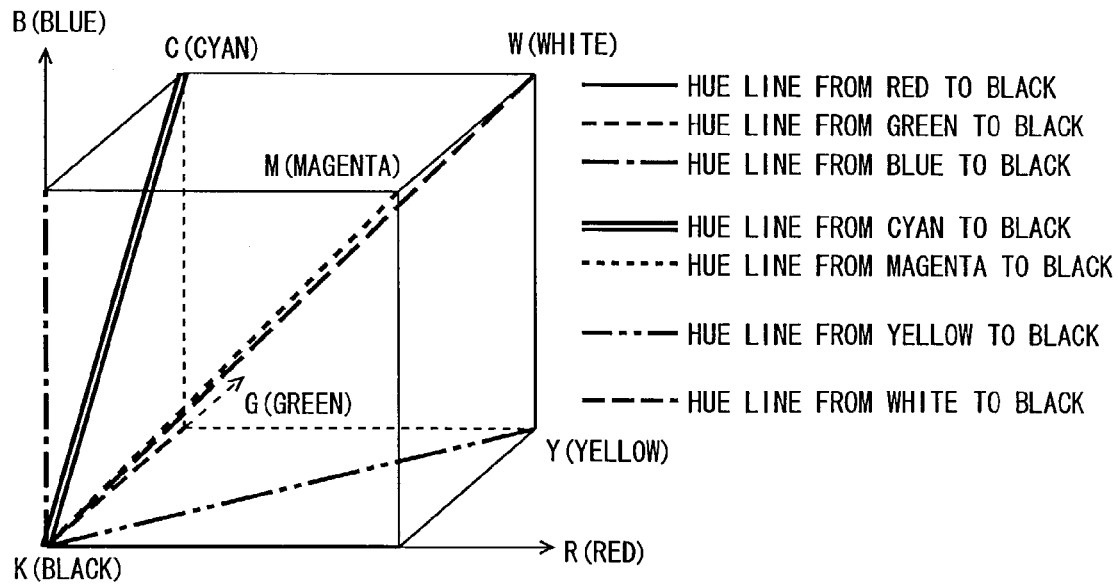

Next, the process for correcting the link file will be described. FIGS. 5A and 5B represent the lattice points as the object of correcting process. FIG. 5A represents hue lines from red (R), green (G), blue (B), cyan (C), magenta (M), yellow (Y) and black (K) to white (W), respectively, and FIG. 5B represents hue lines from (R), green (G), blue (B), cyan (C), magenta (M), yellow (Y) and white (W) to black (K), respectively. Lattice points that are on these lines are the objects of the correcting process.

In the following, a correcting process for lattice points on a hue line from red (R) to white (W), and a correcting process for lattice points on a hue line from blue (B) to black (K) will be described as examples. The correcting process for the lattice points that are on the hue lines from green (G), blue (B), cyan (C), magenta (M), yellow (Y) and black (K) to white (W), respectively, is the same as the correcting process for a lattice point that is on a hue line from red (R) to white (W), and a correcting process for lattice points that are on the hue lines from red (R), green (G), cyan (C), magenta (M), yellow (Y) and white (W) to black (K), respectively, is the same as the correcting process for a lattice point that is on a hue line from blue (B) to black (K).

(1) Correcting process for lattice points on a hue line from red (R) to white (W)

FIG. 6 represents RGB data of lattice points on the hue line from red (R) to white (W) and the colors dependent on printer 104 (CMYK data) related by the link file. Here, referring to FIG. 5A, colors that include red element are magenta (M) and yellow (Y). Therefore, the printer-dependent colors related to the lattice points on the hue line from red (R) to white (W) should desirably be represented simply by magenta (M) and yellow (Y) only. Among the CMYK elements defining the colors dependent on printer 104 that are related to the lattice points on the hue line from red (R) to white (W), elements that are related to red (R) are magenta (M) and yellow (Y), while cyan (C) and black (K) are elements not related to red (R). It is noted that in FIG. 6, cyan (C) and black (K), which are not related to red (R), are included. In the correcting process, the elements (C, K) that are not related to red (R) are distributed to elements (M, Y) that are related to red (R).

Figure 7:
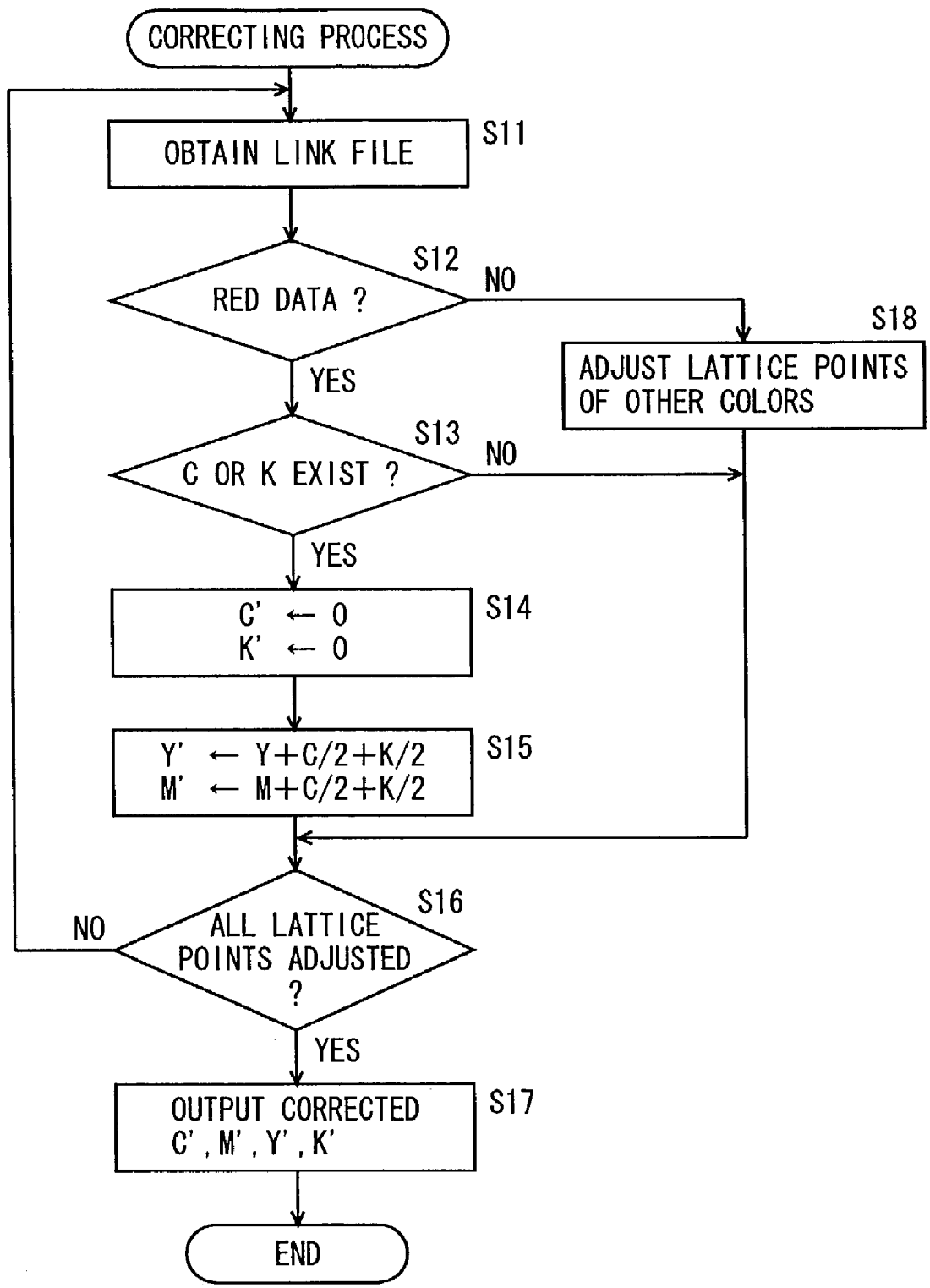
FIG. 7 is a flow chart representing a flow of the correcting process executed by the link file generating apparatus in accordance with the first embodiment.

FIG. 7 is a flow chart representing a flow of the correcting process executed by link file generating apparatus 100 in accordance with the present embodiment. Referring to FIG. 7, first, a link file is obtained (step S11). The link file is the link file generated by link file generating portion 201. Data related to color systems before and after conversion are also obtained as needed.

Thereafter, whether a data included in the link file is a data of a lattice point on the hue line from red (R) to white (W) or not is determined (step S12). If it is true, the flow proceeds to step S13, and if not, the flow proceeds to step S18. In step S18, a process for correcting a data of a lattice point that is on a different hue line is executed.

In step S13, whether the CMYK data related to the lattice points include element of cyan (C) or black (K) that is not related to red (R) or not is determined. When the elements of cyan (C) and black (K) are both "0", it is determined that the elements are not included, and the process proceeds to step S16, and otherwise, the flow proceeds to step S14.

In step S14, the elements of cyan (C) and black (K) are both corrected to "0".

In the next step S15, elements (C, K) that are not related to red (R) are distributed to elements (M, Y) that are related to red (R). An example of this distribution is given by the following equations (3). In the equations, values resulting from the correction of elements (C, M, Y, K) defining the colors dependent on printer 104 are denoted by C', M', Y' and K'.

$$C'=0, K'=0$$

$$Y'=Y+C/2+K/2$$

$$M'=M+C/2+K/2 \qquad (3)$$

The reason why the elements C and K are distributed to elements Y and M in accordance with equations (3) is that when elements C and K are simply set to "0", density will be lower. If the value Y' or M' after correction exceeds the upper limit of 255, the value may be set to the upper limit, 255.

Though elements C and K are distributed equally to elements Y and M here, weighted distribution may be possible.

$$Y'=Y+w1\times C+w2\times K$$

$$M'=M+(1-w1)\times C+(1-w2)\times K \qquad (4)$$

where w1, w2<1.

In the next step S16, whether all the lattice points included in the link file have been processed or not is determined. If it is true, the flow proceeds to step S17, and if not, the flow returns to step S11. When all the lattice points are processed, a corrected link file in which the lattice points are related to corrected CMYK data (C', M', Y', K') is output in next step S17 (step S17).

FIG. 8 represents the RGB data of lattice points on the hue line from red (R) to white (W) and the colors dependent on printer 104 after correction (C', M', Y', K') related by the link file. As can be seen from the figure, the elements C' and K' that define the corrected dependent colors are all corrected to "0". When the CMYK data, which is obtained by color conversion using such a link file, is printed by printer 104, red gradation can smoothly be reproduced.

Though the elements C and K are fully distributed in the above described correcting process, only a prescribed ratio of the elements may be distributed.

$$C'=r1 \times C$$

$$K'=r2 \times K$$

$$Y'=Y+w1 \times (1 \times r1) \times C+w2 \times (1-r2) \times K$$

$$M'=M+(1-w1)(1-r1) \times C+(1-w2)(1-r2) \times K \quad (5)$$

where r1, r2<1.

(2) Correcting process for lattice points on a hue line from blue (B) to black (K)

FIG. 9 represents RGB data of lattice points on the hue line from blue (3) to black (K) and the colors dependent on printer 104 (CMYK data) related by the link file.

In the correcting process, colors dependent on printer 104 related to the RGB data of the lattice points on the hue line from blue (B) to black (K) are corrected such that difference in amount of change among elements between continuous dependent colors becomes small. This correcting process is performed element by element. Here, correction of magenta (M) element will be described as an example. Correction of other elements C, Y and K is the same as the correction of magenta (M) element.

Here, the element M will be represented as M(i) in correspondence with the number "i" of the lattice points ($1 \leq i \leq 17$), and the corrected element M'(i) will be given by the following equations (6).

$$M'(1)=M \quad (1)$$

$$M'(17)=M \quad (17)$$

$$M'(j)=(M(j-1)+M(j)+M(j+1))/3 \quad (6)$$

where 1<j<17.

Figure 10:
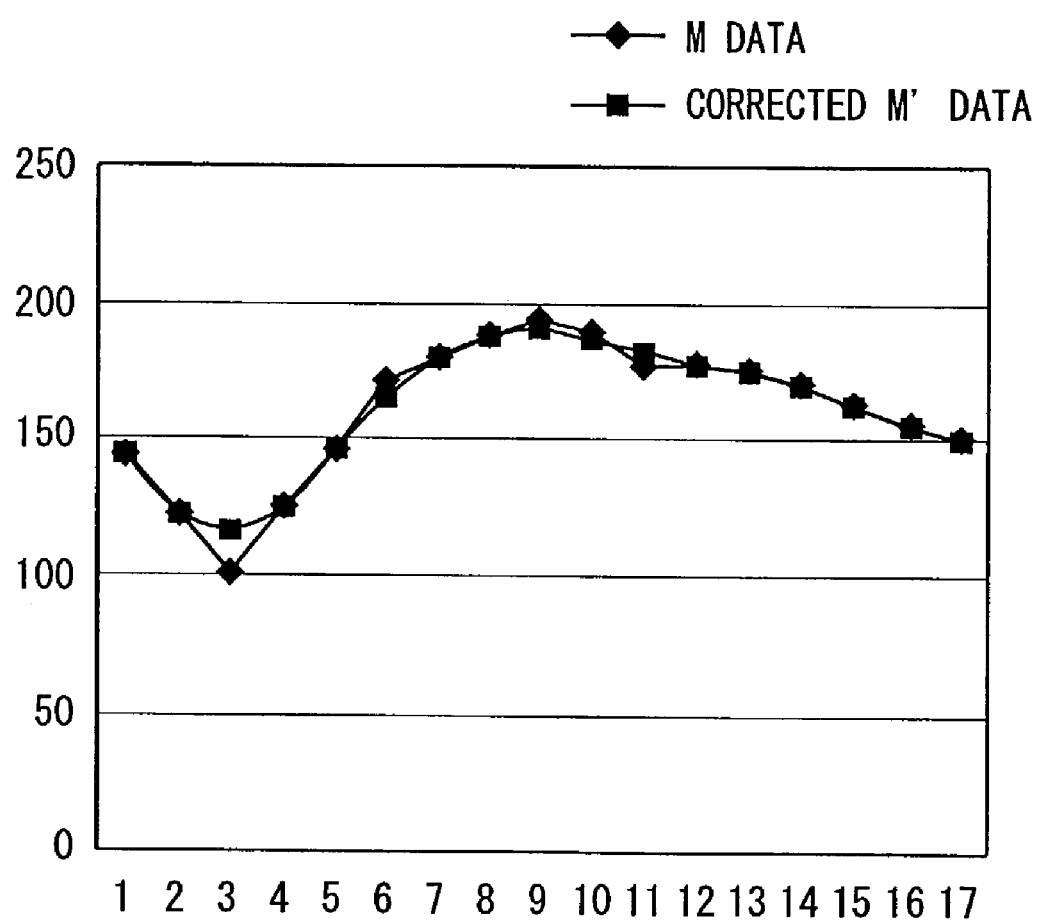
FIG. 10 represents, in a line graph, M data before correction and M' data after correction.

FIG. 10 represents, by a line graph, the data M before correction and the data M' after correction. Referring to FIG. 10, it can be understood that the data M' after correction is given by smoother curve as compared with the data M before correction. FIG. 11 shows a result when the element-by-element correcting process is similarly performed on other elements C, Y and K.

When the correcting process is performed on lattice points on a prescribed hue line as objects, the lattice points as the objects exist on the prescribed hue line, and therefore, the above described undesirable influence of interpolation can be minimized. Particularly when the image data processed by the input side device, that is, the RGB data in the present embodiment, is drawing data and includes gradation, it is possible to improve reproductivity of gradation when the data is processed by an output side device.

It is noted that the correcting process for lattice points on a hue line from white (W) to black (K) substantially corresponds to gray balance adjustment.

As described above, in the link file generating apparatus 100 in accordance with the present embodiment, using a color dependent on display 102 as a reference, a color dependent on printer 104 related thereto by the link file is corrected. Therefore, a link file can be generated that suppresses undesirable influence of interpolation when image data is color-converted.

Further, monitor profile 211 and printer profile 213 are not modified and only the link file is corrected. Therefore, colors before and after color conversion can easily be adjusted with high precision.

Further, a color dependent on printer 104 related to a color dependent on display 102 having the same hue is corrected. Therefore, reproduction of a gradation can be improved when printed by printer 104.

In the present embodiment, in order to enable correction with the amount of change in elements between continuous colors made smaller, an average between continuous preceding and succeeding elements is utilized as the object of processing. An average among four or more continuous elements may be used.

Further, multi-dimensional curves that approximate to respective elements may be calculated using the least squares method. Alternatively, not on the element by element basis, multi-dimensional curved surface that approximates to two or more elements may be calculated, using the least squares method on two or more elements.

When the lattice points on hue lines from red (R), green (G), blue (B), cyan (C), magenta (M), yellow (Y) and black (K) to white (W), respectively, are the objects of processing, the correcting process for the lattice points on the hue line from blue (B) to black (K) described above may be applied.

Second Embodiment

A link file generating apparatus 100A in accordance with the second embodiment separately executes the process for generating a link file linking two devices, and the process for color-converting image data.

Figure 12A:
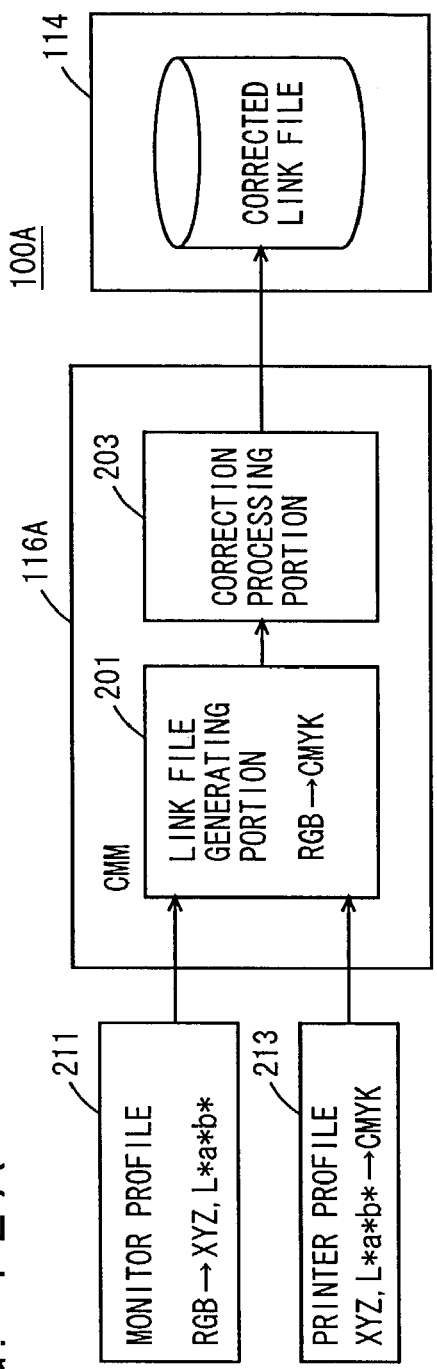
FIGS. 12A and 12B are functional block diagrams representing a function of the link file generating apparatus in accordance with a second embodiment.

FIG. 12A represents a function of link file generating apparatus 100A that executes the process for generating a link file for two devices. When an input side device and an output side device are designated, link file generating portion 201 of link file generating apparatus 100A links the profiles of the designated input side and output side devices to each other, and generates a link file. The generated link file is corrected by correction processing portion 203, and the corrected link file is stored in hard disk 114.

Figure 12B:
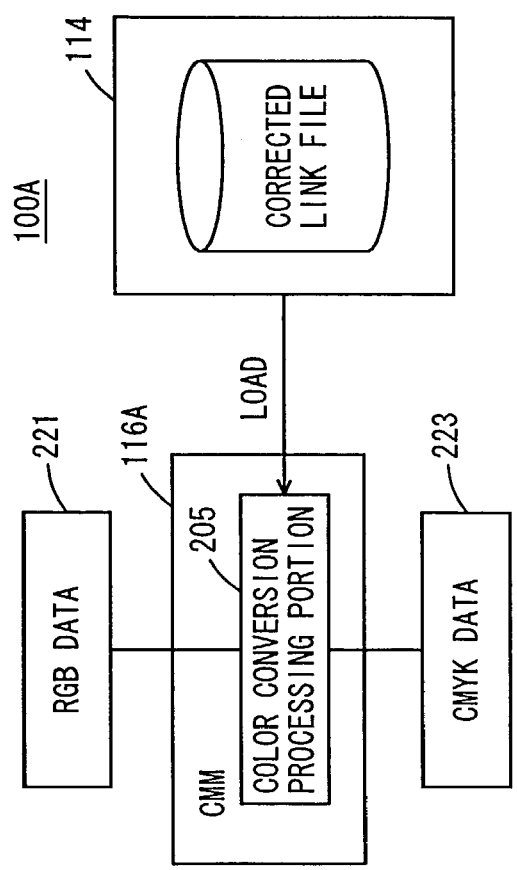

FIG. 12B represents a function of link file generating apparatus 100A that executes the process for color-converting image data. When link file generating apparatus 100A receives RGB data as an input, color conversion processing portion 205 reads the corrected link file corresponding to the input and output devices from hard disk 114, and using the read corrected link file, the RGB data is color-converted to the CMYK data.

In this manner, in link file generating apparatus 100A in accordance with the second embodiment, a link file is generated in advance. Therefore, the amount of processing when the image data is to be color-converted can be reduced, and the throughput can be improved.

Third Embodiment

In a link file generating apparatus 100B in accordance with the third embodiment, among the data defined by a link file generated by linking two profiles, a dependent color corresponding to a lattice point designated by the user is changed to a value designated by the user.

The appearance and configuration of link file generating apparatus 100B in accordance with the third embodiment are the same as those of link file generating apparatus 100 in accordance with the first embodiment, and therefore, description thereof will not be repeated here.

Figure 13:
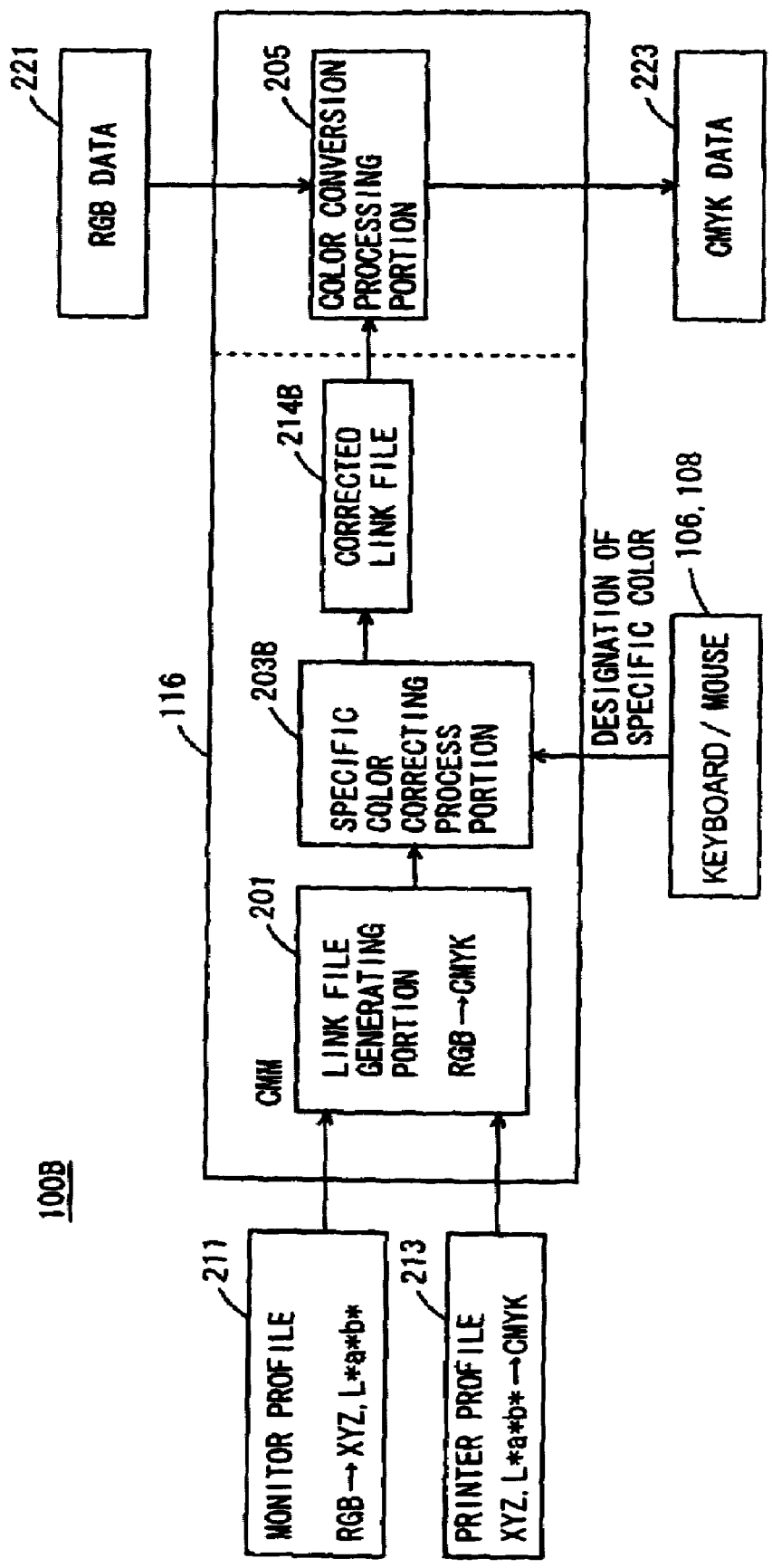
FIG. 13 is a functional block diagram representing a function of the link file generating apparatus in accordance with a third embodiment.

FIG. 13 is a functional block diagram representing a function of link file generating apparatus 100B in accordance with the third embodiment. When a link file generating program is executed by CPU 116, link file generating portion 201, specific color correction processing portion 203B and color conversion processing portion 205 are formed in CPU 116. Though it is assumed in the third embodiment that the link file generating program is executed by CPU 116, link file generating portion 201, specific color correction processing portion 203B and color conversion processing portion 205 may be implemented by hardware circuits.

By specific color correction processing portion 203B, among the data of the link file generated by link file generating portion 201, dependent color (CMYK data) related to a lattice point designated by a user is corrected to a value designated by the user, and a corrected link file 214B is output. Designation of the lattice point and the dependent color by the user is input through keyboard 106 or mouse 108.

Using the corrected link file 214B, color conversion processing portion 205 color-converts RGB data 221 processed by display 102 to the CMYK data to be processed by printer 104. As the color conversion is performed using the corrected link file 214, color distortion of the image printed by the printer can be suppressed.

Figure 14:
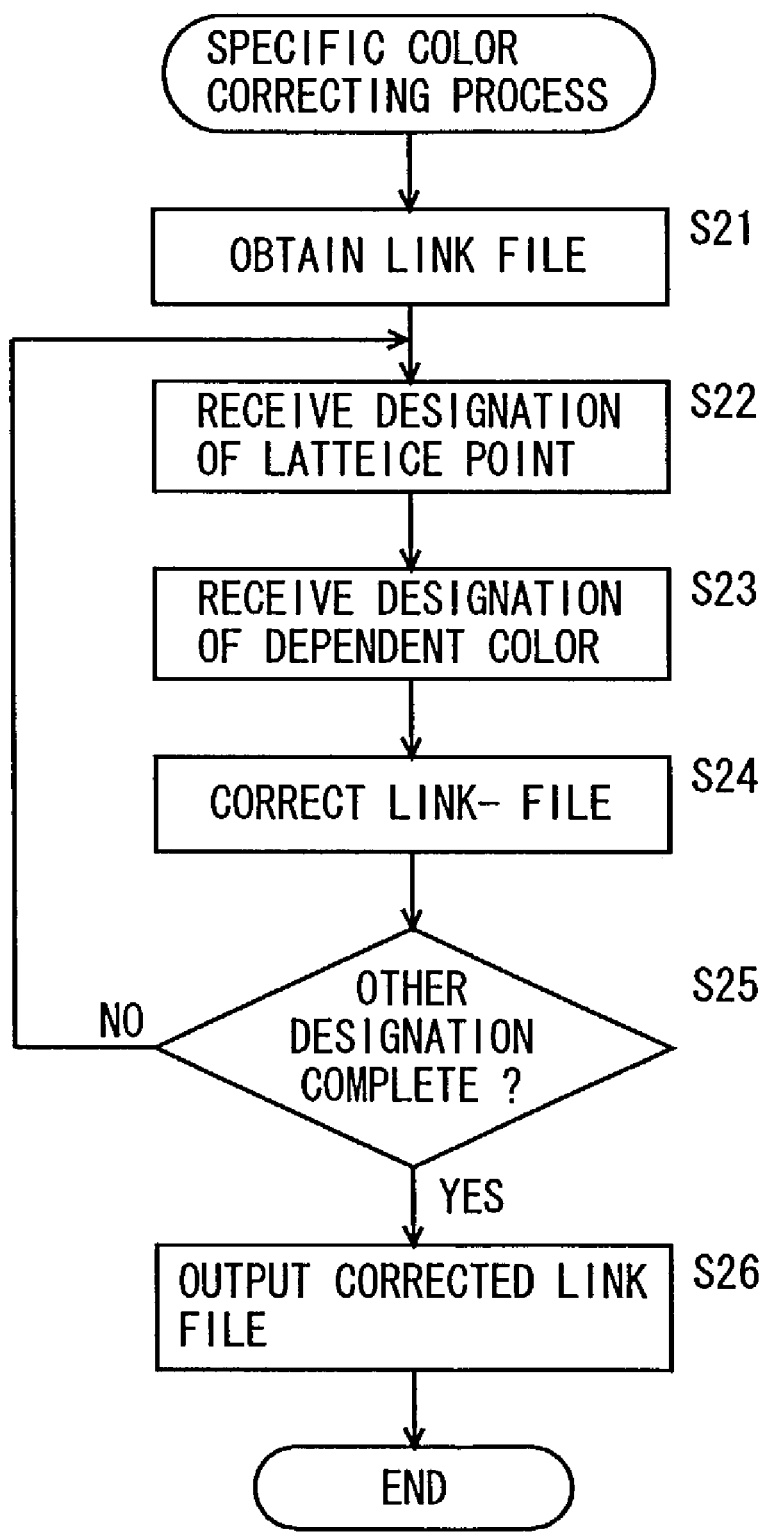
FIG. 14 is a flow chart representing a flow of a specific color correcting process executed by the link file generating apparatus in accordance with the third embodiment.
Figure 16:
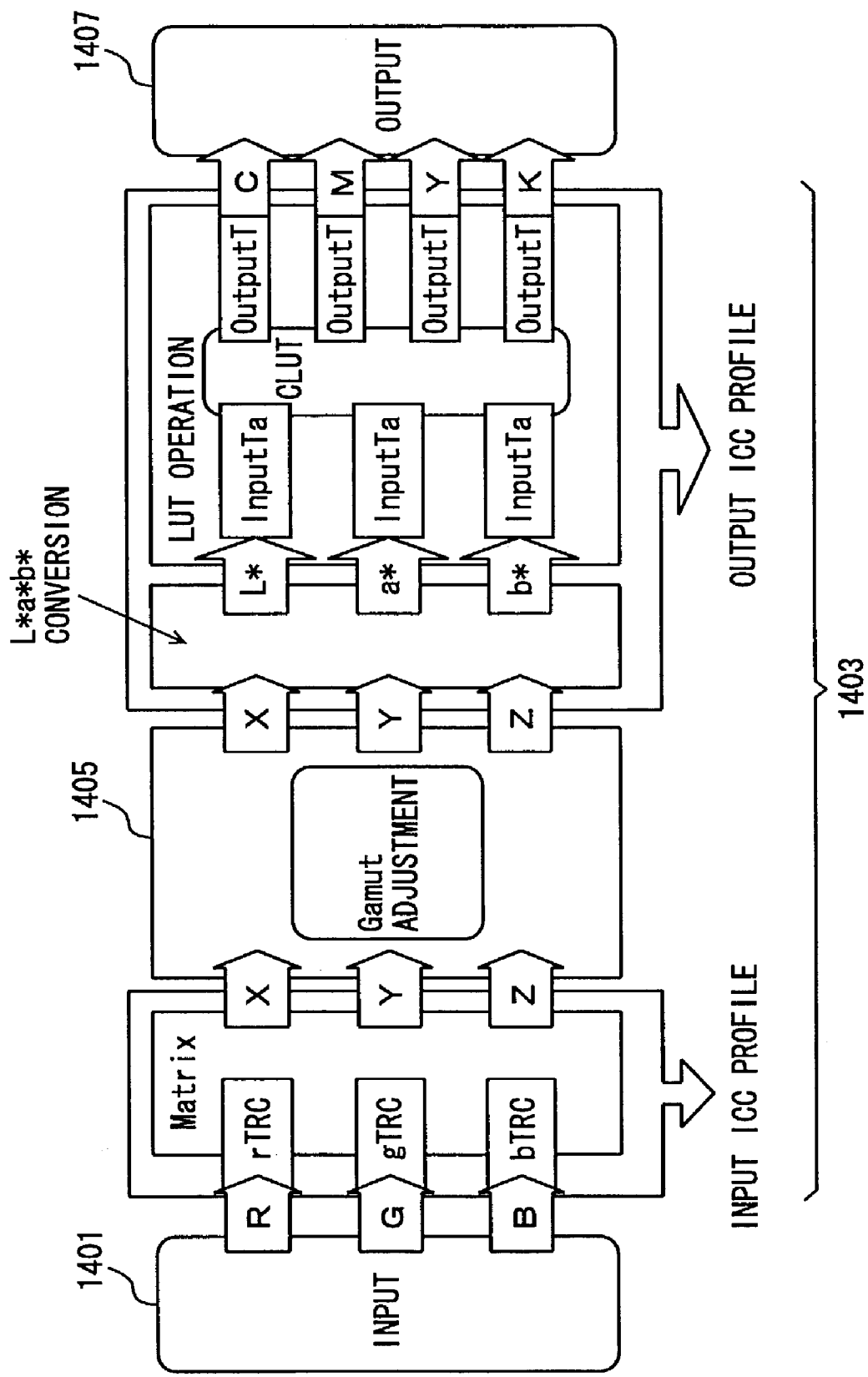
FIG. 16 represents outline of a conventional color management system.

FIG. 14 is a flow chart representing a flow of the specific color correcting process executed by link file generating apparatus 100B in accordance with the third embodiment. Referring to FIG. 14, first, a link file is obtained (step S21). The link file is the link file generated by link file generating portion 201. Data related to color systems before and after conversion are also obtained as needed.

Through keyboard 106 or the mouse, a lattice point is designated among the data included in the link file (step S22). For this designation, GUI (graphical user interface) may be used for easier operation. Specifically, colors represented by the lattice points may be displayed on display 102, and the user may designate a displayed color by mouse 108, for example, and thus a lattice point can be designated.

Thereafter, elements (C, M, Y, K) defining the dependent color related to the lattice point designated in step S22 are designated (step S23). This designation is also made through keyboard 106 or mouse 108. The values C, M, Y and K may be directly input, or GUI may be used for easier input.

Further, the dependent color related to the lattice point designated in step S22 is modified to the dependent color designated in step S23 (step S24). Thus, the link file is corrected.

Thereafter, whether a signal indicating end of lattice point designation has been input or not is determined (step S25). This signal is input by the user through keyboard 106 or mouse 108. When the signal indicating the end is input, the flow proceeds to step S26, and otherwise, the flow returns to step S22.

In step S26, corrected link file 214B is output to color conversion processing portion 205 (step S17). The corrected link file may be stored in hard disk 114.

FIG. 15 shows an example of RGB data (RGB=(0,0,255)) and printer dependent colors (CMYK data and C'M'Y'K' data) before and after correction of a blue lattice point related to each other by link file generating apparatus 100B in accordance with the third embodiment. Referring to the figure, the RGB data (RGB=(0,0,225)) of the blue lattice point is related to the CMYK data of CMYK=(245, 241,3,1) by the link file generating process. The RGB data (RGB=(0,0,255)) of the blue lattice point and the corrected C'M'Y'K' data (C'M'Y'K'=255,178,0,0) are designated by the user, and thus, RGB data (RGB=(0,0,255)) is related to C'M'Y'K' data (C'M'Y'K=255, 178, 0, 0), as shown. Specifically, among the dependent colors defined by the characteristics descriptive data of the monitor, a dependent color desired by the user may be related to a printer dependent color desired by the user.

Generally, a printer prints by applying coloring agents of C, M, Y and K, respectively, to a recording medium. The colors represented by the CMYK color system, however, is not always reproduced and printed precisely. By way of example, in the CMYK color system, blue is given by C=M=255 (100%). When this color is actually printed, it sometimes appears violet, not blue. In such a case, the element of magenta (M) is changed to a smaller value, and the actually printed color comes closer to blue.

In the link file generating apparatus 100B in accordance with the third embodiment, among the data defined by the link file generated by linking two profiles, a dependent color corresponding to a lattice point designated by the user is changed to a value designated by the user. Therefore, a link file can be generated that enables reproduction with high fidelity of a prescribed color, such as blue described above, by the printer.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A computer readable medium encoding a stored link file generating program for making a computer execute steps comprising:

genetrating a link file relating to a plurality of colors that are dependant on a first device to colors that are dependent on a second device by coupling characteristics descriptive data of said first device to characteristics descriptive data of said second device, correcting said link file to adapt a color that is dependent on said second device to a prescribed color, wherein said step of correcting includes the step of selecting, from among colors dependent on said first device, a dependent color of a predetermined hue; and distributing, for the color dependent on said second device and related to said selected dependent color of the first device, an element unrelated to said predetermined hue to an element related to said hue.

2. The link file generating program product according to claim 1, wherein in said step of distributing, distribution by a prescribed ratio is performed.

3. A method of generating a link file, the method comprising the steps of:

generating a link file relating to a plurality of colors that are dependent on a first device to colors that are dependent on a second device by coupling characteristics descriptive data of said first device to characteristics descriptive data of said second device, correcting said link file to adapt a color that is dependent on said second device to a prescribed color, said step of correcting includes the step of selecting, among colors dependent on said first device, a dependent color of a predetermined hue; and distributing, for the color dependent on said second device related to said selected dependent color of the first device, an element unrelated to said predetermined hue to an element related to said hue.

4. The method of generating a link file according to claim 3, further comprising the step of converting, using said corrected link file, image data defined by the colors dependent on said first device to image data defined by the colors dependent on said second device.

* * * * *